United States Patent [19]
Nanno et al.

[11] Patent Number: 5,383,140
[45] Date of Patent: Jan. 17, 1995

[54] POWER SUPPLY CONTROL SYSTEM FOR A PORTABLE COMPUTER

[75] Inventors: Nobuyuki Nanno; Kazuo Akashi; Hiromi Seimiya, all of Tokyo, Japan

[73] Assignee: Kabushiki Kaisha Toshiba, Kanagawa, Japan

[21] Appl. No.: 111,400

[22] Filed: Aug. 25, 1993

Related U.S. Application Data

[60] Continuation of Ser. No. 862,056, Apr. 2, 1992, abandoned, which is a division of Ser. No. 541,978, Jun. 22, 1990, abandoned.

[30] Foreign Application Priority Data

Jun. 23, 1989 [JP] Japan ................................ 1-162228
Jun. 23, 1989 [JP] Japan ................................ 1-162229
Jun. 23, 1989 [JP] Japan ................................ 1-162231
Jun. 23, 1989 [JP] Japan ................................ 1-162234

[51] Int. Cl.6 ................................................ G06F 1/00
[52] U.S. Cl. .................................. 364/708.1; 364/707; 200/43.01
[58] Field of Search .................. 364/708.1; 200/43.01, 200/43.18, 43.22, 318, 322, 327; D13/171, 162

[56] References Cited

U.S. PATENT DOCUMENTS

D. 310,818 9/1990 Zaretsky et al. ................... D13/125
4,571,456 2/1986 Paulsen et al. ................... 364/708 X

FOREIGN PATENT DOCUMENTS 643196 7/1962 Italy ................................ D13/et al.

OTHER PUBLICATIONS

"User's Manual, Four-bit Microcontroller and Peripheral Memory, TLCS–47E/47/470/470A" (portions of title are in the Japanese language), pp. 5–211 through 5–223 and unnumbered final page, published by Toshiba Corporation, dated 1991.
Toshiba T1600 Portable Personal Computer User's Manual, pp. 2–1 through 2–11, undated.
Toshiba T5100 Portable Peronal Computer Reference Manual, 4 pages, undated.
Toshiba T5200 Portable Personal Computer Reference Manual, 6 pages, undated.

*Primary Examiner*—Tan V. Mai
*Attorney, Agent, or Firm*—Finnegan, Henderson, Farabow, Garrett & Dunner

[57] ABSTRACT

A power supply control system for a portable computer having a central processing unit (CPU), and operable in response to power supplied from a rechargeable battery or an alternating current (AC) adapter. The control system includes a charge unit for charging the rechargeable battery; current detectors for detecting power status; and a power control microprocessor for controlling the charge unit independently of the CPU in response to a detected power status.

3 Claims, 8 Drawing Sheets

| LED LAYOUT | L1 ○ POWER /SPEED | L2 ○ BATT. | L3 ○ DC-IN | ○ DISK | ○ CAPS | ○ NUM KANA | ○ SCROLL |
|---|---|---|---|---|---|---|---|
| LIGHT COLOR | GREEN /RED (*1) | ORANGE /RED /GREEN (*2) | RED (*3) | RED | GREEN | GREED | GREEN |

*1 AS CPU ACTUATED AT HIGH SPEED CLOCK "10Mhz", GREEN LIGHT.
   AS CPU ACTUATED AT LOW SPEED CLOCK "8Mhz", RED LIGHT.

*2 AS BATTERY BEING CHARGED RAPIDLY, ORANGE LIGHT.
   AS STATUS OF LOW BATTERY, RED FLICKERING LIGHT.
   AS BATTERY HAS BEEN COMPLETED, GREEN LIGHT.

*3 AS AC-ADAPTER IS USED OR CHARGING, RED LIGHT.
   AS INPUT VOLTAGE OF AC-ADAPTER OR OUTPUT VOLTAGE
   AT POWER-ON TIME IS ABNORMAL, RED FLICKERING LIGHT.

FIG.6

POWER SUPPLY CONTROL SYSTEM FOR A PORTABLE COMPUTER

This application is a continuation of application Ser. No. 07/862,056 filed Apr. 2, 1992, now abandoned which in turn is a divisional application of Ser. No. 07/541,978 filed Jun. 22, 1990, now abandoned.

BACKGROUND OF THE INVENTION

This invention relates generally to computers and, more specifically, the power supply of a portable battery operated computer. The invention includes both a system and the methods for controlling efficiently the power supply of such a portable computer.

As is known, recently computers have been developed which are convenient to carry. In conventional computers of these types, there are two primary methods for supplying the power. In one case, the power is supplied by an alternating current (AC) adapter. In the other case, the power is supplied by internal batteries. In these two methods mentioned above, the central processing unit, hereafter called "CPU", must always verify the status of the external power supply and the charge level of the internal batteries. However, in conventional methods and systems of these types, a single CPU also must control the voltages of the external power supply and internal batteries, and this creates a burden for one CPU. The presently known systems and methods for power supply control using one CPU are not efficient. Also, the known systems do not include any means for indicating to an operator the voltage or power supply status, such as whether or not the power is off.

SUMMARY OF THE INVENTION

Accordingly, an object of the invention is to efficiently control a chargeable power supply and current flowing from an AC adapter to internal batteries constantly.

A further object of the invention is to indicate the status of a power supply for a portable computer.

Still another object of the invention is to display the status of the power supply of a portable computer to the computer's operator, such as whether or not the power is off.

In accordance with one aspect of the present invention, the foregoing objects are achieved by providing a power supply control system for a computer having a central processing unit (CPU) and operable in response to power from a rechargeable battery or an alternating current (AC) adapter The computer includes a charge circuit for controlling a power from the AC adapter to the rechargeable battery, and a power control microprocessor independent of the CPU for controlling the charge circuit, and a detector for supplying status signals representing a plurality of conditions associated with the AC adapter to the microprocessor, wherein the battery or the charge circuit, and the power control microprocessor includes a circuit for generating control signals to control the charge circuit in response to the status signal.

In accordance with another aspect of the present invention, a power supply control system for indicating the status of voltage and current in a computer system includes:

means for monitoring the status of the voltage from an AC adapter and at least one rechargeable battery, and the current flowing from current detectors, comparison means for comparing a detected voltage and current with a reference voltage and current, and means, coupled to a plurality of display elements, for displaying the status of voltage and current in response to the comparison means, whereby the display element shows a low battery state when the detected voltage is below the reference voltage and a voltage abnormality state when a voltage abnormality is present.

Other objects, features, and advantages of the present invention will become apparent from the following detailed description. It should be understood, however, that the detailed description and specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENTS

Figure 1:
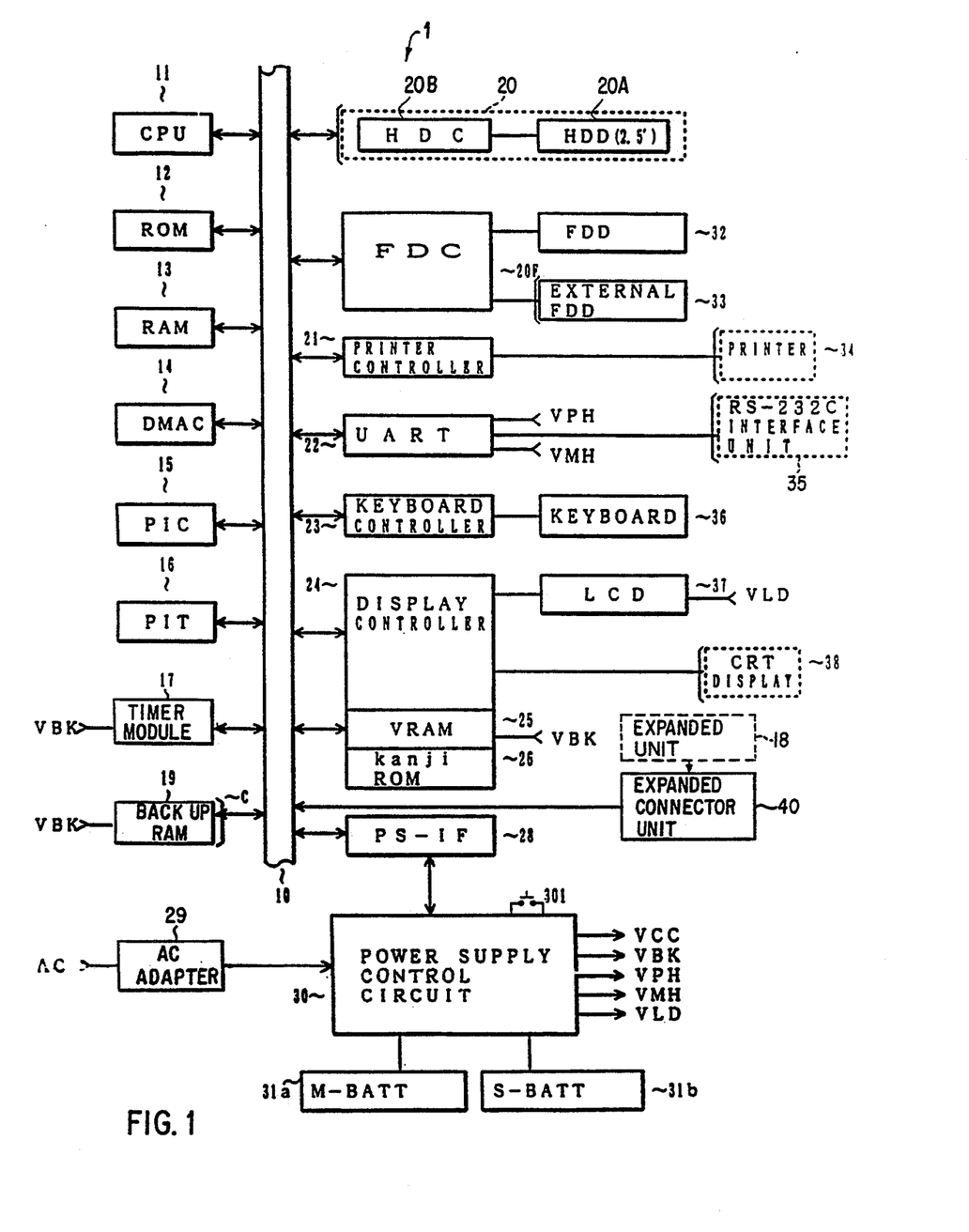
FIG. 1 is a schematic block diagram illustrating a power supply control system with a power control circuit for use in a computer system, according to one embodiment of this invention.

FIG. 1 is a schematic block diagram illustrating a power supply control system with a power control microprocessor for use in a computer system according to one embodiment of this invention. As illustrated, computer system 1 includes various computer components, as follows.

A CPU 11 operates computer system 1 with programs stored in a ROM 12 and RAM 13. ROM 12 stores a basic input or output system program, and RAM 13 stores application programs and data for use by an operator. A direct memory access controller (DMAC) 14 controls and sends data directly between RAM 13 and an input/output apparatus, for example, a hard disk drive (HDD) 20A and a floppy disk drive (FDD) 32, etc., apart from CPU 11.

A programmable interrupt controller (PIC) 15, a programmable interval timer (PIT) 16 and a timer module 17 having a real-time clock with a backup voltage (hereafter called "VBK") of +5VDC are provided. An expanded RAM 18, using particular card slots, provides VBK. A backup RAM 19 having display data therein stores the contents of a program counter for a currently-running program, various registers and a memory and I/O statuses, so that it can restart an interrupted job when repowered.

A hard disk pack 20, which fits particular card slots, includes 2.5 inch hard disk drive (HDD) 20A and a hard disk controller (HDC) 20B. A floppy disk controller (FDC) 20F controls access to floppy disk drive (FDD) 32 connected thereto. A printer controller (PRT-CONT) 21 controls access to a printer 34 connected thereto by a cable.

A universal asynchronous receiver transmitter (UART) 22 is a serial input/output interface, provided with a voltage VPH (+12VDC) and a voltage VMH (+9VDC). A keyboard controller (KBC) 23 controls access to a keyboard 36 connected thereto. A display controller (DISP-CONT) 24 controls display of data on an LCD 37. A video random access memory (VRAM) 25 is a refresh memory to store data to be displayed on LCD 37 or CRT display 38, and is provided with VBK. A kanji-ROM 26 is accessible by kanji character codes, and stores kanji character patterns.

Figure 2:
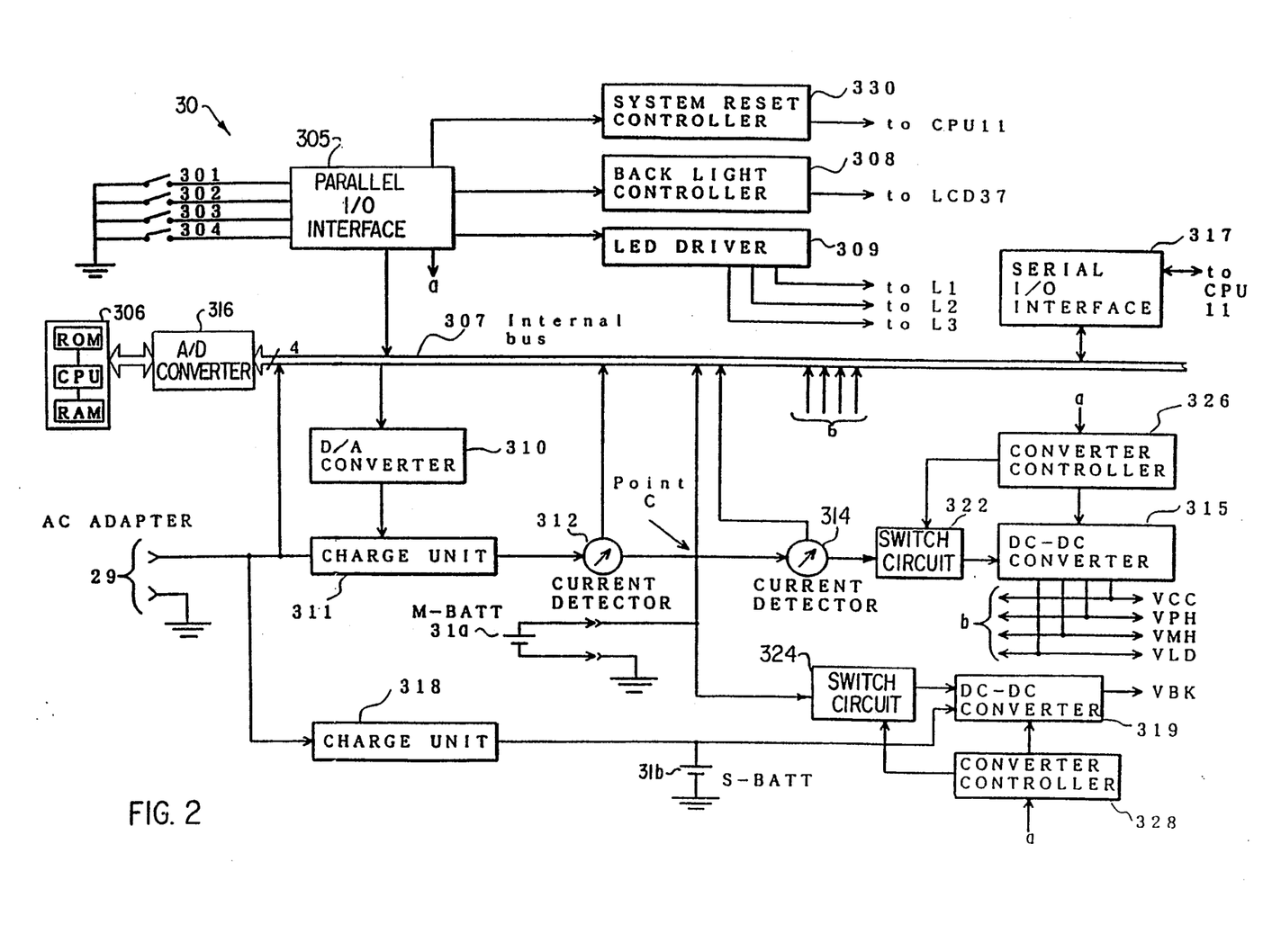
FIG. 2 is a detailed diagram of the power control circuit of FIG. 1.

A power supply interface (PS-IF) 28 controls a power supply control circuit 30 and is connected to CPU 11 via a system bus 10 (to be shown in FIG. 2 in more detail). An AC adapter 29 converts an AC voltage (+120 V) to a DC voltage (+12 VDC) and is plugged into computer system 1 via a DC-in-12V pack. A main battery (M-BATT) 31a and a sub battery (S-BATT) 31b each includes a rechargeable battery (i.e., a nickel-cadminum battery) to provide 7-8VDC, and may be a removable pack.

An external floppy disk drive (FDD) 33 may be connected to FDC 20F by a cable. An RS-232C interface unit 35 is connectable to a serial input/output interface UART 22 by a cable, and LCD 37 is connected to display controller 24. LCD 37 is provided with a voltage VLD (−22VDC). An expanded connector unit 40 is connected to a system bus 10 and is connectable to expanded units (not shown) by a cable. Thus, there are several alternatives to choose.

FIG. 2 shows a detailed diagram of the power supply control circuit of FIG. 1. In FIG. 2, power supply control circuit 30 has a built-in 4-bit single-chip power control microprocessor (PC-microprocessor) 306, which may be a Toshiba module TMP47C440AF. Power control microprocessor 306 is constantly provided a power from M-BATT 31a. PC-microprocessor 306 includes a CPU, a RAM for storing data, and a ROM for storing a control program, for example, a program for calculating the remaining capacity of M-BATT 31a, i.e., a low battery state, and for including a low battery table, which is used to detect low battery states with a detected voltage and charging current. PC-microprocessor 306 controls power to the computer components of computer system 1 in accordance with a current state from a charge unit 311 to M-BATT 31a and a DC-DC converter 315, which current state is detected by current detectors 312 and 314, and an ON/OFF state of power-switch 301, a reset switch 302, a display switch 303, and a mode switch 304. A parallel I/O interface 305 is connected to power-switch 301 and reset switch 302 for initializing the computer components of computer system 1. Display switch 303 supplies a power to LCD 37, and mode switch 304 sets the mode to actuate the expanded unit of computer system 1. Parallel I/O interface 305 holds the ON/OFF states of switches 301-304 and sends a value representing the ON/OFF states of these switches to PC-microprocessor 306 via an internal bus 307 or to DC-DC converter 315 and 319 directly.

A back-light controller 308 supplies a power to LCD 37 in response to a set of variable registers to control the intensity of back-light of LCD 37. An LED driver 309 controls an LED L1 for indicating the ON/OFF state of power switch 301 and the actuating speed of CPU 11 (as shown FIG. 5(a) in more detail), an LED L2 for indicating the capacity state of the battery (as shown FIG. 5(a) in more detail) and an LED L3 for indicating whether AC adapter 29 (of FIG. 1) is present (as shown FIG. 5(a) in more detail).

Figure 6:
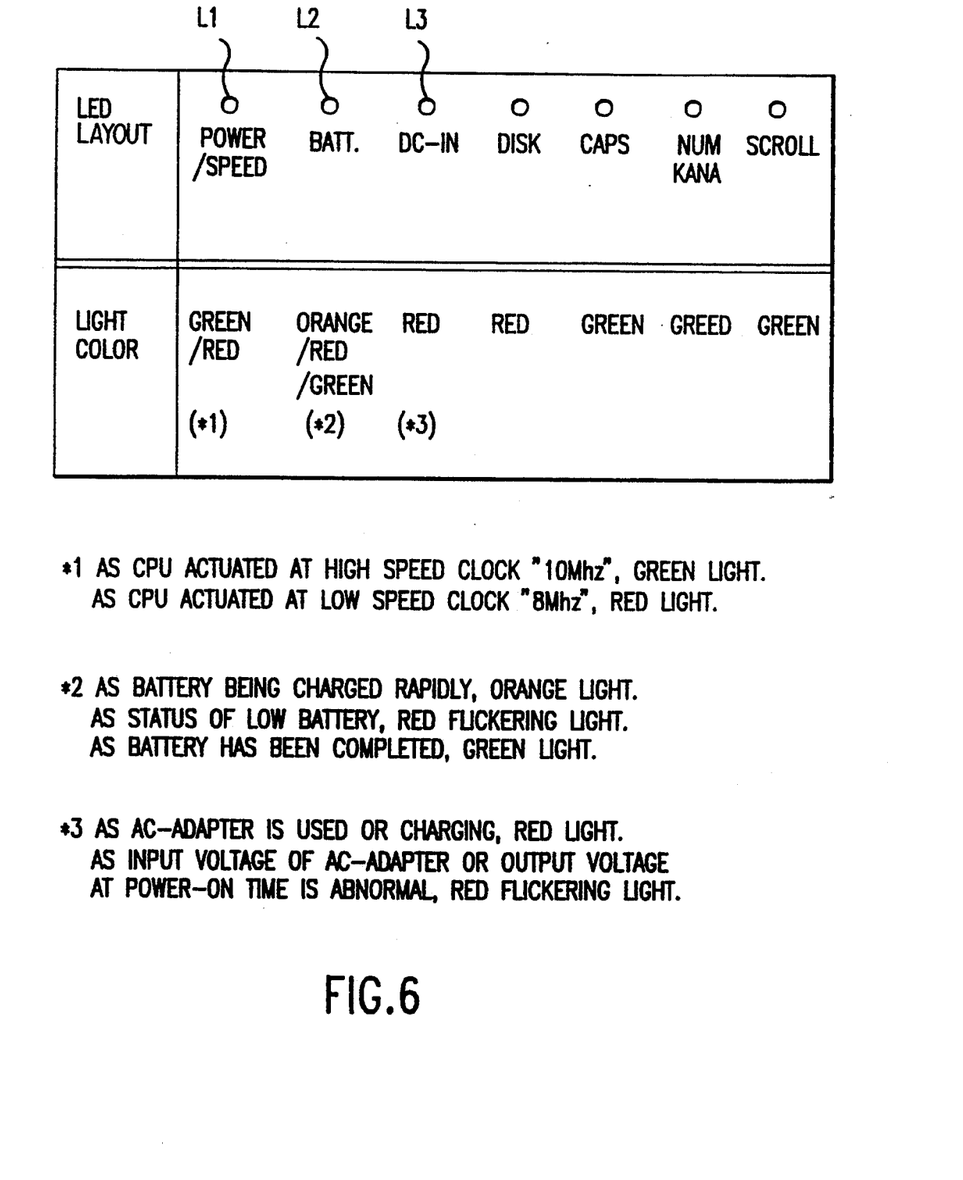
FIG. 6 is a diagram illustrating how the operating states of the computer system are displayed in the LEDs used in conjunction with the invention.

Each LED displays L1, L2 and L3 each may display three different colors (e.g., red, green, and orange as shown in FIG. 6 in more detail). For example, when the green light of LED L1 is on, CPU 11 is actuated at a high speed clock frequency of 10MHz. When the red light of LED L1 is on, CPU 11 is actuated at a low speed clock frequency of 8 MHz. When the orange light of LED L2 is on, batteries M-BATT 31a and S-BATT 31b are charged rapidly. When the red light of LED L2 is flickering, M-BATT 31a is in a low battery state. When the green light of LED L2 is on, charging of M-BATT is completed. When the red light of LED L3 is on, AC adapter 29 (of FIG. 1) is in use or charging. When the red light of LED L3 is flickering, an abnormality is present in the input voltage of AC adapter 29, or in the output voltage at the power-on time, or in the self test of the power supply control circuit. A digital-to-analog (D/A) converter 310 converts a digital output signal from PC-microprocessor 306 to an analog charge control signal and sends the charge control signal to charge unit 311. Charge unit 311, which has a 256 bit DC-DC converter, charges M-BATT 31a in accordance with the charge control signal from D/A converter 310.

Current detector 312 detects a direct current to both M-BATT and DC-DC converter 315, 319, and a current detector 314 detects a direct current to DC-DC converter 315 alone. DC-DC converter 315 converts a DC voltage (+12VDC) from AC adapter 29 or M-BATT 31a to a power supply voltage of, for example, +5VDC, +12VDC, −9VDC and −22VDC, to be supplied to computer system 1.

An analog-to-digital (A/D) converter 316 converts analog input voltages, which are associated with detected current of the current detectors 312 and 314, an output voltage of M-BATT 31a, the power supply voltages and the input voltage of the AC adapter, etc., to a digital voltage for PC-microprocessor 306. A/D converter 316 may have an 8-channel analog input terminal, so as to equally divide the input analog voltages into 255 sections. A serial I/O interface 317 communicates commands sent between PC-microprocessor 306 and CPU 11. A charge unit 318 charges S-BATT 31b and a DC-DC converter 319. DC-DC converter 319 converts a voltage from charge unit 318 and S-BATT 31b to VBK to be supplied to expanded RAM 18, backup RAM 19 and VRAM 25 (of FIG. 1).

Figure 3:
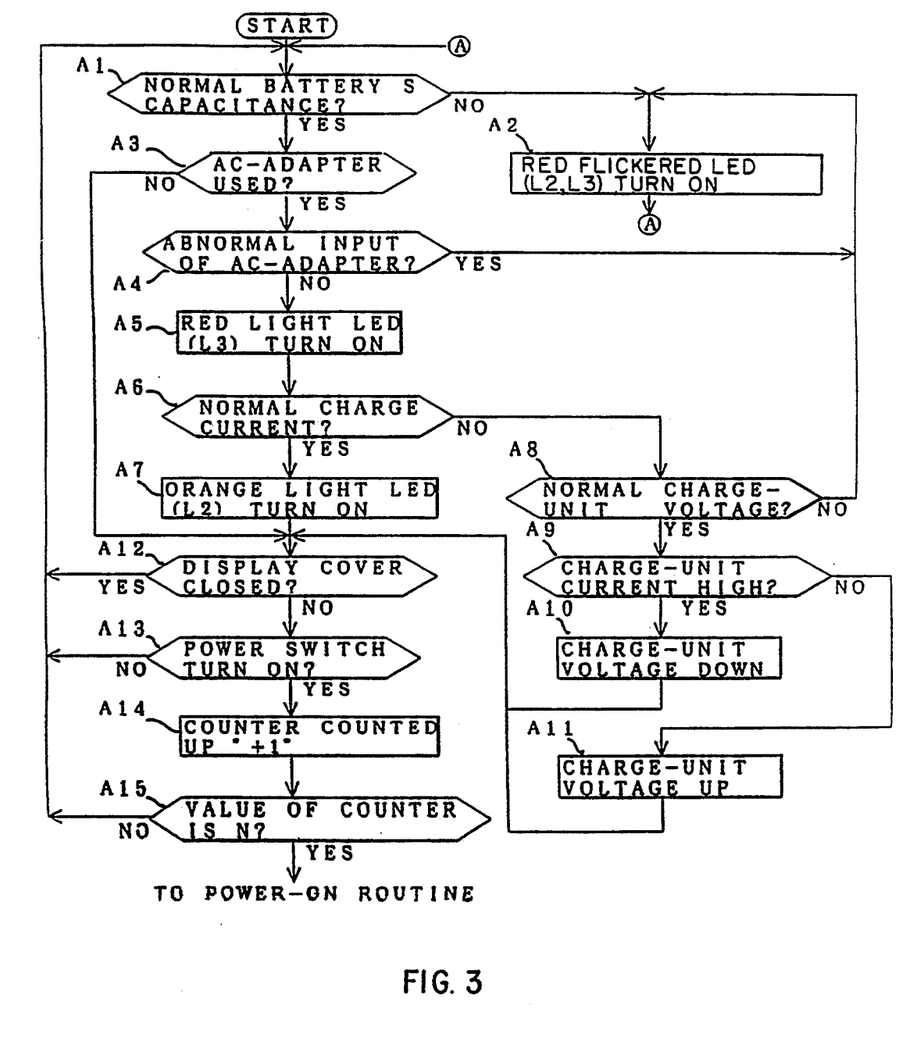
FIG. 3, 4(a) and (b) are flowcharts illustrating control sequences associated with the power control circuit of FIG. 1.
Figure 4A:
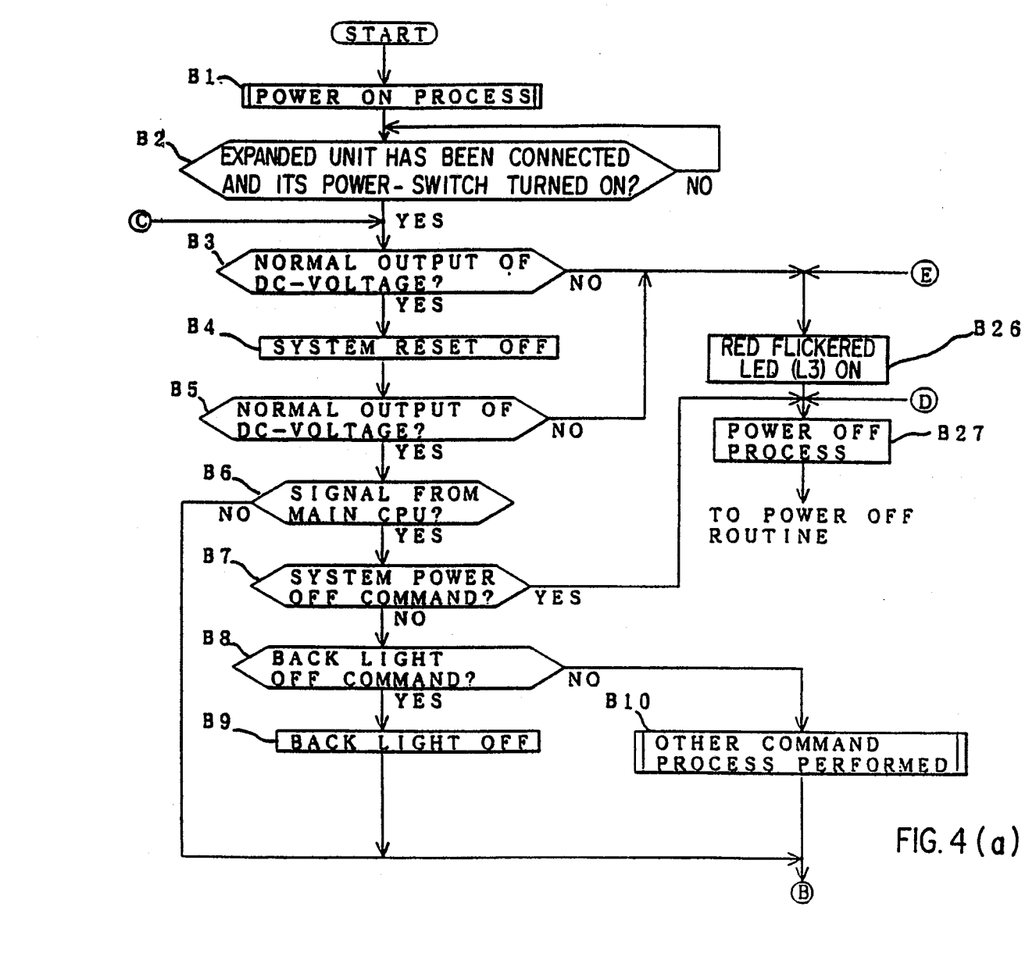
Figure 4B:
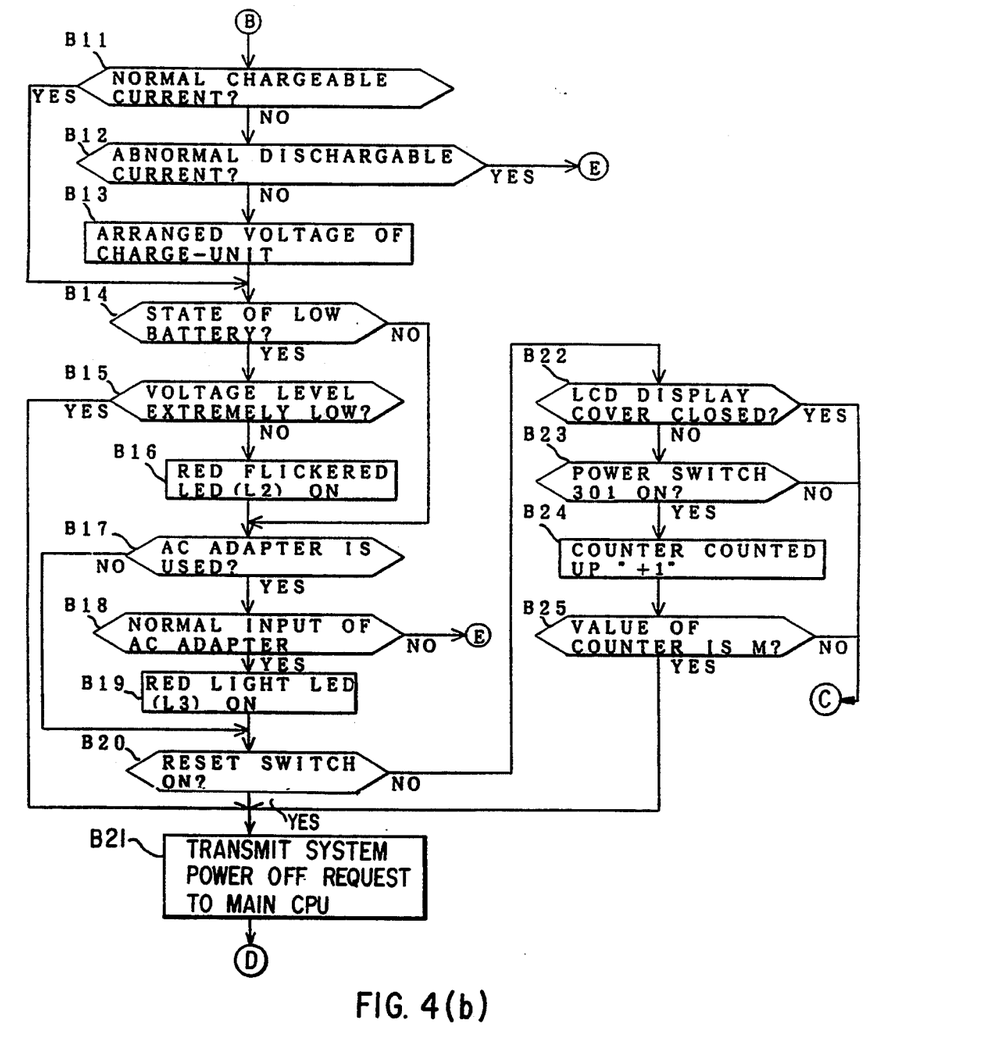

FIGS. 3, 4(a) and 4(b) illustrate a flowchart of a control sequence performed by PC-microprocessor 306 (of FIG. 2), which will be described in detail below.

Figure 5A:
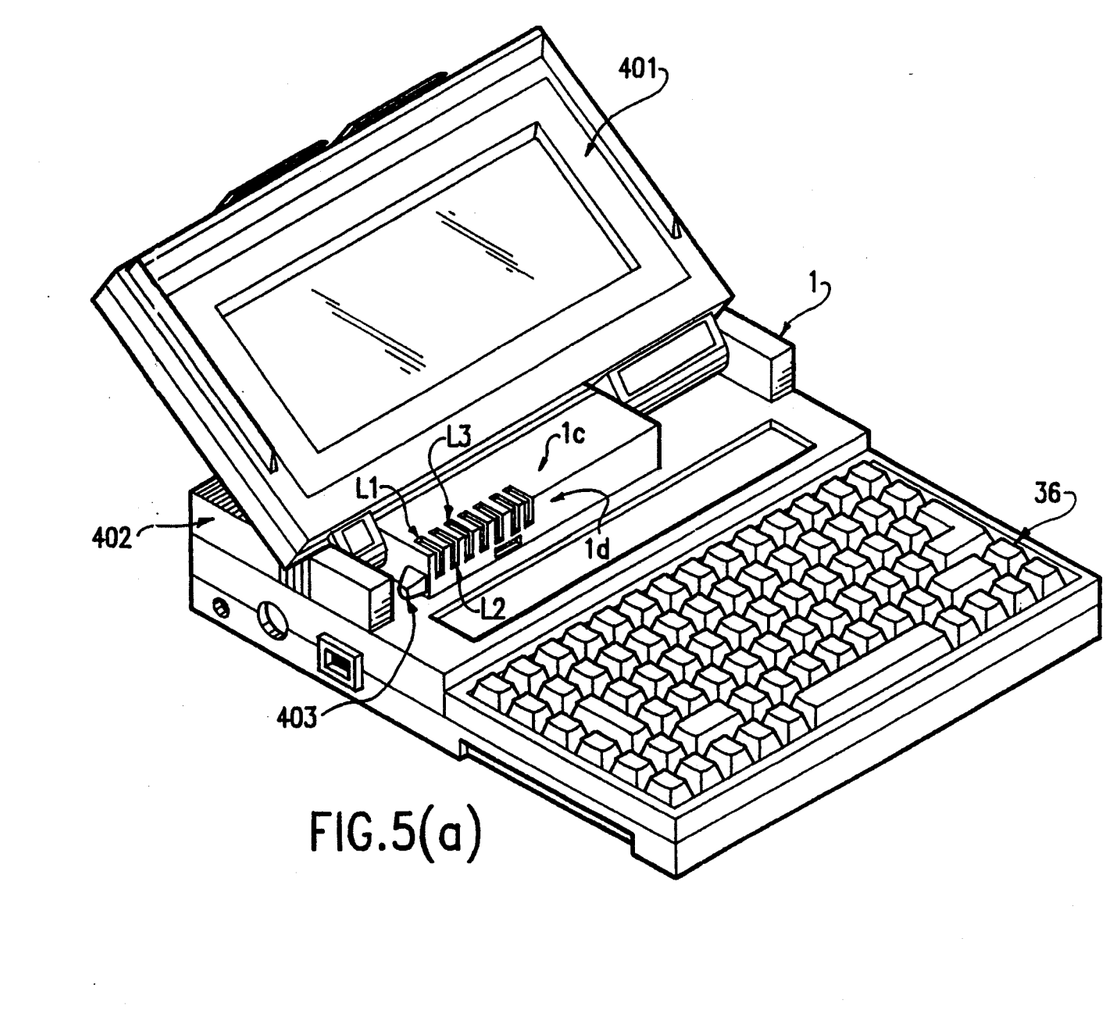
FIG. 5(a) is a perspective top view of a computer system according to an embodiment of the present invention.
Figure 5B:
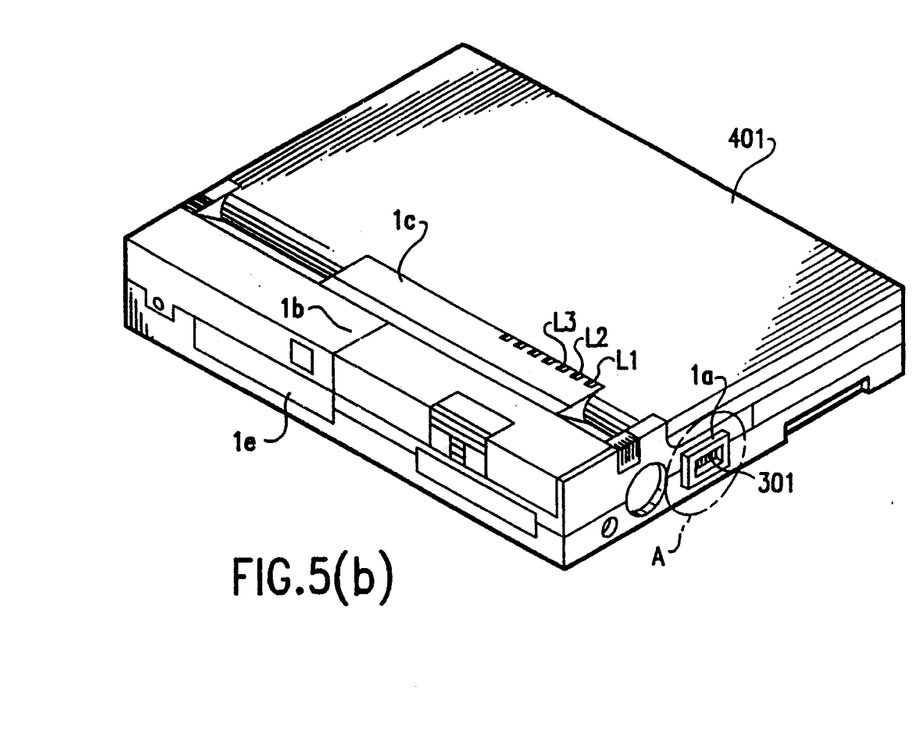
FIGS. 5(b) and 5(c) are other perspective view of the computer system of FIG. 5(a)
Figure 5C:
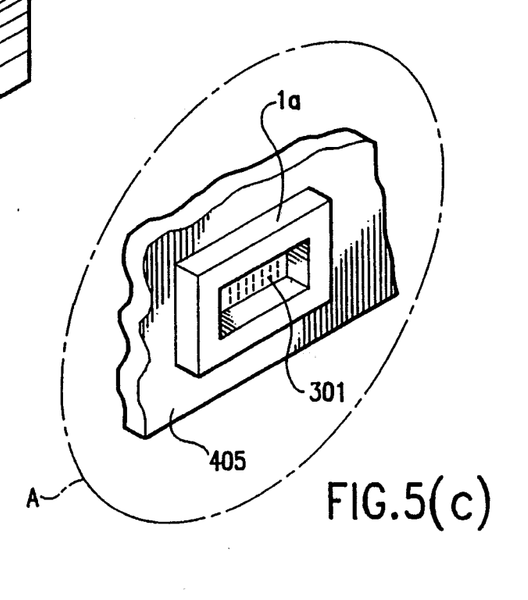

FIG. 5(a) is a perspective view of computer system 1 looking from the front thereof when a display cover 401 of computer system 1 is open. FIG. 5(b) is a perspective view of computer system looking from the rear thereof, when display cover 401 is closed, As shown in an enlarged area A of FIG. 5(b), the edges of a push-button switch 301 on a side surface 405 of computer body 402 is surrounded by a protect wall 1a to prevent the operator from unintentionally pushing push-button switch 301 while carrying computer system 1, but allow the operator to intentionally push push-button switch 301 anytime. As shown in FIGS. 5(a) and 5(b), LED displays L1, L2, and L3, etc., are disposed in an edge portion adjoining surfaces 1c and 1d of a rectangular block 1b and exposed regardless of whether display cover 401 is open or closed. Therefore, the operator can easily identify the operating states of the components of computer system 1, even when display cover 401 is closed.

The flowcharts of FIGS. 3, 4(a), and 4(b) describe a process whereby PC-microprocessor 306 (FIG. 2) controls the power supply. PC-microprocessor 306 in power supply control circuit 30 (of FIG. 1) detects the ON/OFF state of power switch 301 at all times. When power-switch 301 is off, PC-microprocessor 306 executes the power-off routine shown in FIG. 3.

As shown in FIG. 3, when power-switch 301 is on, the ON state of power switch 301 is held in parallel I/O interface 305 and a corresponding state signal is sent to PC-microprocessor 301. PC-microprocessor 301 acknowledges the ON state of power-switch 306 in step A13. In steps A14 and A15, the ON state of power-switch 306 is acknowledged. The time of switching-on power-switch 306 by the operator is detected, and then a counter CTR (not shown) increments one value (+1), and process steps of A1 through A15 are repeated until CTR counts to a predetermined value.

In step A1, it is determined whether the M-BATT's voltage exceeds 10VDC. A signal representing M-BATT's voltage value at point C in FIG. 2 is sent to PC-microprocessor 306 through A/D converter 316. If the determination in step A1 is NO, PC-microprocessor sends a signal to activate a red light in LED L2 to flicker. LED driver 309 sends the signal through parallel I/O interface 305 in step A2, and the process returns to step A1.

If the determination in step A1 is YES, it is determined in step A3 whether AC adapter 29 is in use. The voltage value transferred to PC-microprocessor 306 through A/D converter 316 is anywhere between 0.4VDC and 10VDC. If the determination in step A3 is NO, the process advances to step A12.

If the determination in step A3 is YES, it is determined in step A4 whether the voltage value supplied from AC adapter 29 is within a predetermined range between 11VDC and 16VDC. If it is outside the predetermined range, the process jumps to step A2. If it is within the predetermined range, the process advances to step A5, where PC-microprocessor 306 sends a signal to LED driver 309 through parallel I/O interface 305 to activate a red light in LED L3.

In step A6, it is determined whether a charge current supplied to M-BATT 31a from charge unit 311 is within a predetermined range between 680 mA and 340 mA, for example, by detecting a current at point C (of FIG. 2) by current detector 312, which detected current is transferred to PC-microprocessor 306 through A/D converter 316. If the detected charged current is within the predetermined range then, in step A7, PC-microprocessor 306 sends a control signal to LED driver 309 through parallel I/O interface 305 to activate an orange light in LED L2 to flash when the detected charge current is within the predetermined range or to activate a green light in LED L2 to flash at other times representing an adequate charge capacity of M-BATT 31a, i.e., the time PC-microprocessor 306 detects the charging capacity "$-\Delta v$" of M-BATT 31a. By driving LEDs having multiple colors, the operational state of the computer system is indicated in detail even when display cover 401 is being closed.

If in step A6 the detected charged current does not fall outside the predetermined range, it is determined in step A8 whether the voltage of charge unit 311 at the point C in FIG. 2 is within a predetermined range between 5VDC and 10.5VDC. If it is not within the predetermined range, the process returns to step A2. If it is within the predetermined range, the process advances to step A9.

In step A9, it is determined whether the current of charge-unit 311 is higher than 680mA, for example. If it is not higher in step A9, charge-unit 311 performs one step up in step A11. A voltage between 3.0 VDC and 11.0 VDC from charge unit 311 is divided by an integer 256 (called "one step") and is added to the voltage charging M-BATT 31a, in accordance with a control signal from PC-microprocessor 306 through D/A converter 310. If it is higher in step A9, charge-unit 311 performs a one step down. In step A10 the voltage charging M-BATT 31a is reduced by the one step in accordance with a control signal from PC-microprocessor 306 through D/A converter 310.

When steps 10 or 11 are completed, in step A12 it is determined whether display cover 401 is open or closed in accordance with a switch signal representing the ON/OFF state of display switch 303, which signal is transferred to parallel I/O interface 305. To detect the ON/OFF state of switch 303, a line connecting switch 303 to parallel I/O interface 305 is set in advance at a signal high level "1". When display cover 401 is closed, switch 303 is activated to ground the line, thus changing the line's logical level from "1" to "0". If display cover 401 is closed in step A12, the process advances to step A1. If display cover 401 is open in step A12, the process advances to step A13.

The power-off-routine from steps A1 to A13 is repeated until the operator activates power switch 301. In step A13, it is determined whether power switch 301 is being turned on. Step A13 may be performed for example, for 0.4 sec. If it is, CTR counts up to a predetermined value N, and a power-on routine B (shown in FIGS. 4(a) and 4(b)) is performed.

As shown in FIGS. 4(a) and 4(b), the power-on routine commences in step B1. In step B1, PC-microprocessor 306 sends a control signal to converter controllers 326 and 328 through parallel I/O interface 305. Converter controller 326 and 328 control DC-DC converter 315, 319, respectively, in accordance with the control signal, turn on switches 322 and 324 respectively at 0 VDC. Then, the power is supplied to the components of computer system 1.

In step B2, it is determined whether expanded connector unit is connected and its power switch is turned on in accordance with a switch signal representing the ON/OFF state of mode switch 304, which signal is provided to parallel I/O interface 305. If the determination in step B2 is NO, step B2 is repeated. If it is determined in step B2 that the state of mode switch 304 is ON, then it is determined in step B3 whether DC-DC converter 315 supplies predetermined voltages of, for example, +5VDC, +12VDC, −9VDC, and −22VDC to the computer's components, which voltages are sent to PC-microprocessor 306 through A/D converter 316. If the determination in step B3 is NO, then as in step B26, PC-microprocessor 306 sends a signal to LED driver 309 through parallel I/O interface 305 to activate LED L3 to flicker red light.

If the determination in step B3 is YES, then as in step B4, PC-microprocessor 306 outputs a system reset signal to a system reset controller 330 through parallel I/O interface 305, and system reset controller 330 in turn sends the system reset signal to CPU 11. CPU 11 sets up the computer's components in response to the system reset signal.

In step B5 as in step B3, it is determined whether DC-DC converter 315 supplies predetermined voltages to the computer components. If the determination in step B5 is NO, the process skips to step B26. If the determination in step B5 is YES, it is determined as in Step B6 whether CPU 11 has sent a command to PC-microprocessor 306 through PS-IF 28 (of FIG. 1) and serial I/O interface 317 (of FIG. 2).

If the determination in step B6 is YES, it is determined as in step B7 whether the command is a "System Power Off Command". If the determination in step B7 is YES, the process skips to step B27 where a system power-off process is performed, which is described in detail hereafter. If NO in step B7, PC-microprocessor 306 determines as in step B8 whether the command is a "back light ON/OFF request." If the determination in step B8 is YES, PC-microprocessor 306 sends a "turn off signal" to back-light controller 308 through parallel I/O interface 305, and back-light controller 308 turns off the back-light in response as in step B9, and then the process advances to B11. If the determination in step B8 is NO, it is determined as in step B10 whether AC adapter 29 is in use. If it is in use, a red light or red flickering light in LED L3 is activated in accordance with an output control signal from PC-microprocessor 306 as in step B10. Also, PC-microprocessor 306 sends a low battery state signal to CPU 11 through SIO interface 317. When a POPUP menu on the display 37 is called, the amount of power remaining in M-BATT 31a is displayed as one of seven-levels.

If the determination in step B6 is NO, it is determined in step B11 whether a value representing the current from charge-unit 311 (detected by current detector 312) and a value representing the current from M-BATT 31a to DC-DC converter 315 (detected by current detector 314) are transferred, i.e., the current value detected by current detector 314 subtracted from the current value detected by current detector 312 is within a predetermined range between +255 mA± 10%, for example. If the determination in step B11 is NO, it is determined as in step B12 whether the current value from M-BATT 31a is abnormal for the system, i.e., M-BATT 31a may not be charged up. If YES in step B12, as in step B26, LED L2 is system activated to flicker red light. If NO in step B12, as in step B13, charge-unit 311 performs the same steps as in steps A8-A11.

If the determination in step B11 is YES, as in step B14, it is determined whether the state and the manner for calculating the amount of the remaining power of the remaining capacity of M-BATT 31a is low. Detection of the low battery state and a method of calculating an amount of remaining power is explained in detail in a copending U.S. patent application Ser. No. 07,134,370 of the same assignee. PC-microprocessor 306 changes a low battery voltage value when the low battery state is detected, in accordance with the current and voltage from M-BATT 31a, so as to ensure accurate detection of the low battery state.

If the determination in step B14 is NO, the process skips to step B17.

If YES, in step B14, as in step B15, PC-microprocessor 306 determines whether the voltage from M-BATT 31a to DC-DC converter 315 is below the changed low battery value. If the determination in step B15 is NO, LED L2 is actuated to flicker red light in response to an output control signal from PC-microprocessor 306. Then as in step B17, it is determined whether AC adapter 29 is in use. If the determination in step B17 is NO, the process skips to step B20. If YES in step B17, as in step B18, it is determined whether the voltage from AC adapter 29 is 100 VDC or 0 VDC. If the determination in step B18 is NO, the process advances to step B26. If it is YES in step B18, as in step B19, LED L3 is activated to flicker red light in accordance with an output control signal from PC-microprocessor 306.

In step B20, it is determined whether the ON/OFF state of reset switch 302 is detected, which is transferred through parallel I/O interface 305. If the determination in step B20 is NO, as in step B22, it is determined whether the ON/OFF state of display switch 303 is detected, i.e., whether display cover 401 is open. If YES in step B22, the process returns to step B3. If NO in step B22, as in step B23, PC-microprocessor 306 determines whether the ON/OFF state of power switch 301 is detected. If a signal transferred through parallel I/O interface 306 is at a logical level "1", the process returns to step B3. If the signal is at a logical level "0", as in step B24, PC-microprocessor 301 confirms the ON state of the power switch and CTR increments by one (+1). In step B25, it is determined whether CTR has counted up to a predetermined value M. If NO in step B25, the process returns to step B3.

In step B15 or step B20 or B25, if the determination is YES, the process advances to step B21 and then step B27, wherein PC-microprocessor 306 sends the "System Power Off Request" to computer system 1, through serial I/O interface 317 and PS-IF 28. In response to the system power off request signal, CPU 11 sends an "ACK" to PC-microprocessor 306.

When PC-microprocessor 306 does not receive the "ACK" signal, it determines that abnormalities (e.g., a program overturn) are present in computer system 1, and performs power off sequence protect HDD 20. When it receives the "ACK" signal, it waits the "System Power Off Request" from CPU 11 for above a minute (above five minutes in lower battery state).

When PC-microprocessor receives the "System Power Off Request" from CPU 11, it returns the "ACK" signal to CPU 11. The CPU 11 interrupts the program currently running and saves the contents of RAM 13, RAM 18, the I/O statuses, the contents of the registers, etc. into backup RAM 19 having a memory capacity of, for example, 16K bytes. If FDD 32 or HDD 20A is accessed, the save operation is also performed after an access end is reached (Resume Function).

If PC-microprocessor 306 waits for one minute (or five minutes) but still does not receive the "System Power Off Command" from CPU 11, it sends a "Time Out Power Off Request" to CPU 11.

When CPU 11 receives the "Time Out Power Off Request," it returns the "ACK" signal to PC-microprocessor 306 and performs the save operation as much as possible until the power is turned off. When the save operation is completed, CPU 11 sends a "System Power Off Command" to PC-microprocessor 306 and enters a halt (HLT) mode.

When PC-microprocessor 306 receives the system power off command, it returns the "ACK" signal to CPU 11, cuts off the power to the computer components, and the process advances to the power-off routine.

As mentioned above, PC-microprocessor 306 performs the power off routine shown in FIG. 3, when the power to the computer components is stopped, and performs the power on routine shown in FIG. 4(*a*) and 4(*b*) when the power is supplied to them.

Numerous modifications and variations of the present invention are possible in light of the above teachings. It is therefor to be understood that, within the scope of the appended claims, the present invention can be practiced in a manner other than as specifically described herein.

What is claimed is:

1. A portable computer unit comprising:
   a body having a plurality of exterior surfaces,
   a single ON/OFF push button switch disposed to project through one of said exterior body surfaces and being operable to control a supply of power to circuitry within the computer body;
   a wall projecting outwardly from the one body surface beyond the outmost extent of the ON/OFF switch and extending along the one body surface in juxtaposition with and around the edge of the ON/OFF switch, to enclose the ON/OFF switch and protect the ON/OFF switch from being inadvertently pushed by an operator while the computer unit is being moved.

2. The portable computer unit according to claim 1, wherein the projecting wall is located at a side surface of the portable computer unit.

3. The portable computer unit according to claim 2, wherein the projecting wall is located at the side surface close to a leg portion of a display unit.

* * * * *